3,274,283
PRODUCTION OF CONJUGATED DIOLEFINES
James Robert Bethell, Epsom Downs, England, assignor to The Distillers Company Limited, Edinburgh, Scotland, a British company
No Drawing. Filed Apr. 16, 1962, Ser. No. 187,980
Claims priority, application Great Britain, May 19, 1961, 18,257/61
16 Claims. (Cl. 260—680)

This invention relates to the preparation of conjugated diolefines from olefines.

According to the present invention the process for the production of a conjugated diolefine comprises reacting a mono-olefine, the molecule of which contains a chain of not less than four carbon atoms, at an elevated temperature, in the vapour phase, with an oxygen-containing gas over a catalyst comprising phosphoric acid deposited on tin oxide.

The phosphoric acid may be deposited on the tin oxide either as such or in the form of a heat-decomposable salt of phosphoric acid with a volatile base, such as ammonium phosphate. The catalyst mixture may suitably contain about 6% by weight of phosphorus calculated as phosphoric acid. Under the reaction conditions the catalyst mixture may comprise at least some tin phosphate.

The catalytic mixture of the present invention may, if desired, be deposited on a support such as silica.

Any of the oxides of tin or substances yielding these oxides, may be used in the manufacture of the catalytic mixture, such as stannic oxide, stannous oxide, meta-stannic acid or mixtures of such oxides. The tin oxides may be obtained by water hydrolysis of cationic salts of tin, such as the chlorides, and recovering and heating the resulting precipitate. To obtain complete hydrolysis it may be necessary to add a volatile base such as ammonia. Alternatively the hydrated oxide of tin prepared by the action of aqueous nitric acid on tin metal may be employed.

The phosphoric acid may be deposited on the tin oxide in any suitable manner, for example by impregnation of the tin oxide with the acid or by addition of the acid to an aqueous slurry of oxide followed by drying.

The catalytic mixture of the present invention may also comprise other metal compounds, e.g. oxides, known to normally act as catalyst activators.

After deposition of the phosphoric acid and addition, if desired, of other metal compounds as activators, the catalytic mixture of the present invention may be subjected to a pre-heat treatment for instance at about 600° to 1000° C.

In the process of this invention, a mono-olefine, the molecule of which contains a chain of not less than four carbon atoms, in admixture with a free-oxygen containing gas, is brought into contact with the catalyst in any suitable manner, for example in a fixed bed reactor or in a fluidised bed reactor. The proportion of mono-olefine in the feed may vary within fairly wide limits, but it is preferred to operate within the range 1% to 25% by volume. It is preferred to use butene, 2-methylbutene-1 or 2-methylbutene-2 as olefine starting materials in the process, butene being converted to butadiene and the methylbutenes to isoprene.

The concentration of oxygen in the reaction mixture may vary within fairly wide limits, but it is preferred to operate with an oxygen concentration between 1% and 21% by volume of the reaction mixture. The feed also contains a diluent which is preferably substantially inert under the conditions of the reaction, and which may be, for example, nitrogen or steam. It is preferred to use a mixture of nitrogen and steam as diluent, and the oxygen may thus conveniently be supplied in the form of air.

The reaction is preferably carried out at a temperature below 500° C., particularly in the range 200° C.–500° C. The contact time may be, for example, within the range 1–30 seconds. The reaction may be carried out at atmospheric pressure, subatmospheric pressure or superatmospheric pressure.

The conjugated diolefines formed in reactions according to this invention may be recovered by any suitable means, for example by extraction into a solvent, or by condensation, if necessary with freezing, and fractionation of the production.

The catalytic mixture of the present invention may be reactivated after prolonged use by heating in air at about 600°–1000° C.

The process of the invention is further illustrated by the following examples in which all parts are by weight.

*Example 1*

7.5 parts by weight of phosphoric acid (85% w./w.) was added to an aqueous slurry of 100 parts by weight of stannic oxide, the mixture thoroughly stirred and then dried at 125° C. The dried mixture was broken down to pass through a 25 BSS sieve and then pelleted using 2% by weight of graphite as a lubricant.

A gaseous mixture of, by volume, 10.0% 2-methylbutene-2, 10.3% oxygen, 40.2% nitrogen, and 39.6% steam was passed over the catalyst maintained in a reactor at 450° C., the contact time being 4.0 seconds.

Of the 2-methylbutene-2 fed to the reactor 25.0% was converted to isoprene. The yield of isoprene based on 2-methylbutene-2 consumed was 69.3%.

*Example 2*

A gaseous mixture of, by volume, 9.9% butene-2, 50.4% of air, and 39.7% steam was passed over a catalyst identical to that used in Example 1, maintained in a reactor at 448° C., the contact time being 4.0 seconds.

Of the butene-2 fed to the reactor 35.0% was converted to butadiene. The yield of butadiene based on butene-2 consumed was 70.8%.

I claim:

1. A process for the production of a conjugated diolefine which comprises reacting a mono-olefine selected from the group consisting of butene-1, butene-2, 2-methyl-butene-1 and 2-methylbutene-2, at an elevated temperature, in the vapor phase, with a molecular oxygen containing gas over a catalyst consisting of the mixture obtained by depositing phosphoric acid on tin oxide.

2. A process as claimed in claim 1 wherein the phosphoric acid is deposited on the tin oxide in the form of a heat-decomposable ammonium phosphate.

3. A process as claimed in claim 1 wherein the catalyst contains about 6% by weight of phosphorus calculated as phosphoric acid.

4. A process as claimed in claim 1 wherein the catalyst contains tin phosphate.

5. A process as claimed in claim 1 wherein the catalyst is deposited on a support.

6. A process as claimed in claim 5 wherein the support is silica.

7. A process as claimed in claim 6 wherein the tin oxide is obtained by hydrolysis of cationic salts of tin followed by heat treatment of the resulting hydrolysis product.

8. A process as claimed in claim 7 wherein the cationic salt is tin chloride.

9. A process as claimed in claim 1 wherein the tin oxide is prepared by the action of aqueous nitric acid on tin metal.

10. A process as claimed in claim 1 wherein after deposition of the phosphoric acid the catalyst is subjected to a heat treatment before use at a temperature in the range of about 600° to 1000° C.

11. A process as claimed in claim 1 wherein the proportion of mono-olefine present in the feed is in the range 1 to 25% by volume.

12. A process as claimed in claim 1 wherein the proportion of oxygen present in the reaction mixture is between 1 and 21% by volume.

13. A process as claimed in claim 1 wherein the feed contains a gaseous diluent inert under the reaction conditions.

14. A process as claimed in claim 13 wherein the diluent is selected from the group consisting of nitrogen, steam, and a mixture thereof.

15. A process as claimed in claim 1 carried out at a temperature within the range 200° to 500° C.

16. A process as claimed in claim 1 wherein the contact time is within the range 1 to 30 seconds.

References Cited by the Examiner

UNITED STATES PATENTS

| | | | |
|---|---|---|---|
| 2,627,527 | 2/1953 | Connolly et al. | 260—604 |
| 3,156,705 | 11/1964 | Kerr | 252—437 X |
| 3,161,670 | 12/1964 | Adams et al. | 260—680 X |
| 3,207,807 | 9/1965 | Bajars et al. | 260—680 |
| 3,207,810 | 9/1965 | Bajars | 260—680 |
| 3,211,800 | 10/1965 | Bajars | 260—680 |

PAUL M. COUGHLAN, JR., *Primary Examiner.*

ALPHONSO D. SULLIVAN, *Examiner.*

UNITED STATES PATENT OFFICE
CERTIFICATE OF CORRECTION

Patent No. 3,274,283 September 20, 1966

James Robert Bethell

It is hereby certified that error appears in the above numbered patent requiring correction and that the said Letters Patent should read as corrected below.

Column 2, line 61, for "claim 6" read -- claim 1 --.

Signed and sealed this 22nd day of August 1967.

(SEAL)
Attest:

ERNEST W. SWIDER
Attesting Officer

EDWARD J. BRENNER
Commissioner of Patents